2,988,543
PROCESS FOR THE TREATMENT OF POLY-OLEFINS

Kurt Meyer, Frankfurt am Main, Ernst Jacob, Hofheim (Taunus), and Siegfried Sommer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 3, 1956, Ser. No. 575,712
Claims priority, application Germany Apr. 9, 1955
10 Claims. (Cl. 260—93.7)

The present invention relates to a process for the treatment of poly-olefins.

In Belgian Patent 533,362 corresponding to German applications Z3799, Z3862 and Z3882, Belgian Patent 534,792 corresponding to German application Z3941, Belgian Patent 534,888 corresponding to German application Z3942, and in U.S. applications Serial Nos. 469,059, filed November 15, 1954, 482,412 and 482,413, both filed January 17, 1955, the latter now abandoned, which latter applications correspond to the above patents, is described a low pressure preparation of plastic materials prepared from high molecular poly-olefins, especially poly-ethylenes, at low temperatures with the aid of reducible heavy metal compounds, especially titanium-tetrachloride and alkali metals, alkaline earth metals or earth metals, the corresponding hydrides or organo-metal compounds and similar compounds, especially aluminum-alkyl-halides.

The low pressure polymerization described in the aforesaid patents and patent applications is performed using inert dispersing agents, for example hydrocarbons, such as hexane, heptane, octane, cyclohexane, toluene or aliphatic hydrocarbons which are obtained in the distillation of petroleum and boil between 100° C. and 250° C. In this process the polymer is obtained in a finely divided form and suspended in the solvent. In the further treatment of the polymer it must be separated from the dispersing agent used and from the residual catalyst adhering to or included in the polymer. Thus, for example, the polymer is separated from the dispersing agent by filtration and then heated in order to destroy and to dissolve the residual quantities of the catalyst. The polymer so treated is again filtered, repeatedly washed with methanol or isopropanol, butanol, cyclohexanol or another alcohol, and then dried. Alternatively, the polymer suspension obtained is immediately mixed with an alcohol or an alcoholic acid, the solution is stirred for some time and, if desired, heated. Following this treatment the polymer is separated by filtration, washed with an alcohol and dried. Still further, the polymer obtained by filtration may be treated with an aqueous acid, for example dilute nitric acid.

In all these cases the polymer has been processed in an acid medium, that is the residual catalysts adhering to the polymer are destroyed and dissolved out by acid hydrolysis. If the polymerization is performed using a catalyst that contains acid groups, the processing of the polymer does of course not entail the use of additional acids. When, for example, titanium tetrachloride and aluminum-diethyl-monochloride are used as catalyst substances, it is possible to operate in a manner such that the polymer suspension is mixed with but one alcohol, for example, isopropanol, the resulting solution is stirred for some time and then filtered. The polymer is again washed with an alcohol and can then be dried.

It has been found that from a technical point of view low pressure poly-olefins practically cannot be worked up with an acid agent, since both in an alcoholic and in an aqueous medium the free acid causes considerable corrosion in containers, conduits and centrifuges, and since the product itself is contaminated by noteworthy quantities of the material of which the apparatus is made, for example iron; furthermore, the polymer still contains traces of acid which in the further treatment cause discolorations and at the high temperatures applied during the working up give rise to strong corrosions in the processing machinery. Now we have found that low pressure poly-olefins, especially polyethylene prepared as described in the aforesaid patents and patent applications can advantageously be worked up by treating the polymer which has been separated from the dispersing agent or the polymer suspension with an aqueous or alcoholic solution of organic or inorganic substances having an alkaline reaction.

The process of this invention offers the advantage to prevent corrosions in any type of processing machinery. As substances having an alkaline reaction there may be used the alkali metal hydroxides, preferably sodium hydroxide, calcium hydroxide, ammonia, diethanol amine and the like. These hydroxides also allow in principle of operating in an aqueous medium or in dispersing agents, such as alcohols; as alcohols suitable for use in the process of this invention there may be used more especially methanol, ethanol, propanol, isopropanol, butanol, cyclohexanol and similar alcohols. The process of this invention involves the further advantage to yield, after processing, foils and injection moldings having a considerably brighter shade and at the same time they are more clear and transparent than comparable products which have been worked up with the use of an acid agent.

If poly-olefins are processed in aqueous solutions of 0.1 to 20 percent strength of alkalies, it is necessary to add to the processing bath a small amount of an emulsifier, such as alkyl sulfonates, the alkyl groups of which compounds may contain 6 to 20 carbon atoms, since in the absence of an emulsifier, the water will not moisten the hydrophobic poly-olefin. If the aforesaid aliphatic and aromatic hydrocarbons are used in the polymerization, it has proved advantageous to employ especially poly-ethoxylated alkyl phenols, such as poly-ethoxylated isooctyl phenol for processing low pressure polyethylenes.

In processing the polymers with the use of aqueous alkaline substances, two different methods may be applied:

(1) After separation of the polymer from the dispersing agent by filtration, the poly-olefin is stirred for a certain time with water, an emulsifier or a wetting agent in the presence of substances having an alkaline reaction, then filtered off with suction and washed until neutral.

(2) The polymer suspension is stirred with an aqueous solution of an alkali metal immediately after the polymerization. The originally brown suspension grows pale after some time and can be filtered. The polymer is suspended in water to which an emulsifier has been added and washed until neutral.

In the treatment of the polymer in alcoholic alkalies using alcohols, such as methanol, ethanol, propanol, isopropanol, butanol, cyclohexanol and similar alcohols, the polymer suspension is preferably mixed, while stirring, with the alcoholic alkalies, filtered off with suction and washed with one of the aforesaid alcohols or another solvent, for example acetone. When the polymer is after-washed with water, it is likewise recommended to use water to which a small amount of a wetting agent or an emulsifier has been added.

The amount of alkali which is to be used depends on the content of catalyst of the product. Generally, 0.1 to 2.0 percent, calculated upon the poly-olefin, is necessary. The proportion of aqueous or alcoholic lye:polymer suspension may be selected as desired, preferably in a proportion of 1:8 to 1:1.

The treatment of the polymer suspension or the polymer with an aqueous lye requires good agitation to afford an intimate mixing of the components. Generally it suffices to stir the mixture for 1 hour to decolorize and to neutralize the polymeric mixture. On washing it with water, the product forms a suspension which is stirred for 20 minutes and can then be filtered with suction.

The process according to this invention can be performed both at room temperature and at a raised temperature up to about 80° C. to 100° C. It is understood that the process can also be performed continuously using appropriate machinery. The following examples serve to illustrate the invention, but they are not intended to limit it thereto:

*Example 1*

Ethylene in cyclohexane was polymerized in the presence of titanium tetrachloride and aluminum-diethyl-monochloride as catalyst substances; after filtration with suction 200 grams of a dark brown polymer were obtained on a fritted glass. The polymer contained 60 grams of cyclohexane. The polyethylene cake so obtained is intensively stirred for 30 minutes with 1 liter of an aqueous solution of 3 percent strength of ammonia to which 5 grams of poly-ethoxylated isooctyl phenol are added, the resulting solution is filtered off with suction, and the product obtained is washed with water until the filtrate is neutral and free from emulsifier. The end product obtained is dried at 85° C. in a vacuum drying cabinet. It yields on molding a colorless clear film.

*Example 2*

In a polymerization mixture 300 liters of a high-boiling aliphatic hydrocarbon (boiling range 160–180° C.) to which titanium tetrachloride and aluminum-mono-ethyl-dichloride were added as a catalyst, 100 kilograms of ethylene were consumed during the polymerization. The resulting suspension was introduced immediately after the polymerization and with application of pressure into a vessel provided with a stirrer and having a capacity of 500 liters; into this vessel were previously introduced 50 liters of a sodium hydroxide solution of 1 percent strength. The mixture was well stirred for 1 hour and then centrifuged by means of a pushing centrifuge. Moist polyethylene was obtained in a yield of 140 kilograms, 10 kilograms of which are aqueous lye and 30 kilograms of which are hydrocarbons. The product so obtained was suspended in 600 liters of water to which 140 grams of an emulsifier were added; the suspension was stirred for 10 minutes and then again centrifuged. The resulting product was again suspended in 600 liters of water, filtered off, and the polymer was dried.

The end product treated on an injection molding apparatus yielded colorless and clear moldings.

*Example 3*

500 grams of a suspension of 30 percent strength of polyethylene (an aliphatic hydrocarbon is used as suspending agent) were intensively stirred for 30 minutes at 40° C. with 0.2 liter of a methanolic solution of 5 percent strength of potassium hydroxide. After filtration with suction, the final product obtained was stirred for 30 minutes with 0.3 liter of water to which 3 grams of alkyl sulfonate have been added, again filtered and the filtrate was washed with water until neutral and free from chloride and emulsifier. After drying, a snow-white powder of polyethylene was obtained which, on molding, yielded clear, colorless foils.

We claim:

1. The process for the low pressure polymerization of an olefin in a hydrocarbon diluent containing a catalytic amount of a catalyst comprising an alkyl aluminum compound and a salt of a metal of subgroups IV to VI of the periodic table, the improvement comprising removing the catalyst residues from the polyolefin by adding an alkaline compound to the suspension of the polyolefin in said hydrocarbon diluent, stirring the resulting mixture, and then separating the solid polyolefin from said mixture.

2. The process of claim 1 wherein the alkaline compound is inorganic.

3. The process of claim 1 wherein the alkaline compound is organic.

4. The process of claim 1 wherein the alkaline compound is added in aqueous form.

5. The process of claim 4 wherein an emulsifier is added to the aqueous alkaline solution to assist in the water-wetting of the hydrophobic polyolefin.

6. The process of claim 1 wherein the alkaline compound is added in an alcohol.

7. The process of claim 1 wherein the catalyst comprises a titanium halide and an alkyl aluminum compound.

8. The process of claim 1 wherein a wetting agent is employed during treatment of the polyolefin with the alkaline solution.

9. The process of claim 1 wherein the polyolefin is washed with water after being filtered from suspension.

10. The process of claim 9 wherein a member of the group of an emulsifying agent and a wetting agent is employed in washing the polyolefin.

References Cited in the file of this patent

UNITED STATES PATENTS

| 2,023,495 | Thomas | Dec. 10, 1935 |
| 2,062,845 | Thomas et al. | Dec. 1, 1936 |
| 2,290,794 | Alvarado | July 21, 1942 |
| 2,606,179 | Boyd | Aug. 5, 1952 |
| 2,838,477 | Roelen et al. | June 10, 1958 |

FOREIGN PATENTS

| 473,116 | Canada | 1951 |
| 533,362 | Belgium | May 16, 1955 |

Notice of Adverse Decision in Interference

In Interference No. 92,645 involving Patent No. 2,988,543, K. Meyer, E. Jacob and S. Sommer, PROCESS FOR THE TREATMENT OF POLYOLEFINS, final judgment adverse to the patentees wes rendered Feb. 15, 1965, as to claim 7.

[*Official Gazette June 22, 1965.*]